(12) United States Patent
Barkan

(10) Patent No.: US 7,555,460 B1
(45) Date of Patent: Jun. 30, 2009

(54) PAYMENT SYSTEM AND METHOD USING TOKENS

(75) Inventor: Mordhay Barkan, Kefar Sirkin (IL)

(73) Assignee: Diversinet Corp., Toronto (CA)

( * ) Notice: Subject to any disclaimer, the term of this patent is extended or adjusted under 35 U.S.C. 154(b) by 365 days.

(21) Appl. No.: 09/586,881

(22) Filed: Jun. 5, 2000

(51) Int. Cl.
*G06Q 40/00* (2006.01)

(52) U.S. Cl. .............................. 705/39; 705/40; 705/41; 705/64; 705/65; 705/67; 235/492

(58) Field of Classification Search ............. 705/39–41, 705/54, 67, 60, 44, 34, 53, 65, 64, 1; 700/233; 709/219; 379/114.01; 713/201; 715/835; 235/492
See application file for complete search history.

(56) References Cited

U.S. PATENT DOCUMENTS

| | | | | |
|---|---|---|---|---|
| 5,386,369 A | * | 1/1995 | Christiano | 705/400 |
| 5,839,119 A | * | 11/1998 | Krsul et al. | 705/39 |
| 5,872,844 A | * | 2/1999 | Yacobi | 705/69 |
| 5,903,880 A | * | 5/1999 | Biffar | 705/39 |
| 5,949,875 A | * | 9/1999 | Walker et al. | 702/78 |
| 5,987,430 A | * | 11/1999 | Van Horne et al. | 705/34 |
| 6,029,150 A | * | 2/2000 | Kravitz | 705/39 |
| 6,205,436 B1 | * | 3/2001 | Rosen | 705/65 |
| 6,236,971 B1 | * | 5/2001 | Stefik et al. | 705/1 |
| 6,236,981 B1 | * | 5/2001 | Hill | 705/67 |
| 6,295,482 B1 | * | 9/2001 | Tognazzini | 700/233 |

OTHER PUBLICATIONS

Anthes, "Digital cash solution sought", Computerworld. Framingham: Sep. 26, 1994. vol. 28, Iss. 39; p. 24, 1 pgs.*
Anthes, Gary, Sep. 26, 1994 "Digital cash solution sought", Computerworld, web page from proquest-proquest.umi.com/pqdweb?index (2 pages).*
Business wire "Subscriber Computing Inc. Installs Real-Tome Information System Suite For Douglas Telecommunications Inc.", Nov. 19, 1997 (dialog file 810 No. 0775909 BW1292).*
Direct purchasing on the Internet Jack Large. Corporate Finance. London: Mar. 1997., Iss. 148; p. 38.*

* cited by examiner

*Primary Examiner*—Harish T. Dass
(74) *Attorney, Agent, or Firm*—Dinesh Agarwal, P.C.

(57) ABSTRACT

A method for collecting payment over a distributed digital computerized communication environment by a third party for services using digital tokens issued by a third party. The services may be provided by the third party or another party. The tokens are acquired by the user and stored in its database. The user cancels the tokens itself as it uses the provided services. The second party can monitor and report on the cancellation of tokens by the user. Fraud is reduced or eliminated by providing an open system that permits other parties to observe the user's cancellation of its tokens.

12 Claims, 6 Drawing Sheets

| | 31 | 32 |
|---|---|---|
| 331 | User of service ID | User-1 |
| 332 | Date of use | 10.26.97 |
| 333 | Time of use | 19.55 |
| 334 | Token ID | T-103 |
| 346 | Signature-3 | 3597711 |
| | Previous token ID | T-102 |
| | Date of use | 10.22.97 |
| | Time of use | 14.50 |
| 347 | Signature-2 | 5911663 |
| | Previous token ID | T-101 |
| | Date of use | 10.22.97 |
| | Time of use | 13.15 |
| 348 | Signature-1 | 9912355 |
| | Previous token ID | T-100 |
| | Date of use | 10.22.97 |
| | Time of use | 11.05 |
| 349 | Signature-0 | 45991432 |

Fig. 5

| | 31 | 32 |
|---|---|---|
| 331 | User of service ID | User-1 |
| 332 | Date of use | 10.26.97 |
| 333 | Time of use | 19.55 |
| 334 | Token ID | T-103 |
| 346 | Signature-3 | 3597711 |
| | Previous token ID | T-102 |
| | Date of use | 10.22.97 |
| | Time of use | 14.50 |
| | Signature-2 | 5911663 |
| | Previous token ID | T-101 |
| | .... | |
| 421 | User of service ID | User-5 |
| 422 | Date of use | 10.24.97 |
| 423 | Time of use | 11.31 |
| 424 | Token ID | T-788 |
| 425 | Signature-37 | 1199933 |
| 426 | User of service ID | User-19 |
| | Date of use | 10.22.97 |
| | Time of use | 09.40 |
| | Token ID | T-488 |
| | Signature-83 | 9411781 |
| | ...... | |

Row group 41 spans the first section; row group 42 spans the second section.

Fig. 6

PAYMENT SYSTEM AND METHOD USING TOKENS

CROSS-REFERENCE TO RELATED APPLICATIONS

This is a continuation of International Application No. PCT/IL98/00563, filed Nov. 19, 1998, which claims priority on Israeli Application No. 122,263, filed Nov. 20, 1997.

FIELD OF THE INVENTION

The present invention relates to systems and methods for collecting payments in a distributed digital communications environment. The invention relates in particular to large networks and the Internet.

BACKGROUND OF THE INVENTION

In the present distributed digital communication systems, service providers may find it difficult to collect a fee for services performed. It may be desirable for users to have an instrument for paying for various services or products available in the net.

At present, it is not possible for service/product providers to get paid for service where the provider does not take part in every transaction.

Prior art systems and methods may not be suitable to answer this need.

Thus, a service provide may possibly devise a software package with an integral module which accounts for the use of the software, so that the service provider may charge the user accordingly. Thus, for example, a provider of a registered E-mail service may be paid for services provided.

A weak point in such a software is that it is too easy to neutralize the accounting module, to render it inoperable, so that the user may use the software for free.

And, if one user does not have the required technical skills for that, he/she may be sure that a hacker somewhere across the globe already did it, and that a "cracked/broken" version of the software is available on the Internet. Thus, a hacker or unauthorized person may spread worldwide a software package to attack the legitimate software. This may result in a large scale misuse of the software, while avoiding the required payment.

At present, it is impossible to detect such an attack on one's software or to prevent it. It is impossible to detect illegitimate use of the software, that is use of "cracked" software which denies the software owner their legitimate profits.

In the present business climate, with users of the software spread across the globe, it is very difficult or impossible to enforce a policy or to survey transactions performed.

Another approach to the fee collecting problem may be to channel all transactions through the service provider's facility. The service provider then has control on any and all transactions being performed, and can enforce a payment policy as desired.

This would require a tremendous investment by the service provider, to set up huge service centers worldwide, capable of concurrently serving many users. Thus, this approach may not be practical. It is therefore not desirable that the service provider take part in any and all transactions between users.

Still another payment method may include the user using his/her credit card to pay in real time for any transaction.

The disadvantage of this method is that the credit card number may be compromised, since the Internet and similar links are not secure. If an unauthorized person intercepts the credit card information, this may be used in fraudulent transactions. The card owner may find it difficult to prove a specific transaction was not authorized, or even to detect some of the unauthorized charges.

At present, a person paying with his/her credit card over the Internet may be exposed to large losses. Thus, payment over a distributed net is difficult.

Still more difficult is collecting fees for transactions between two parties, where the service provider is a third party and is not a party to the actual transactions.

For example, a provider of walkie-talkie devices or wireless sets cannot collect a fee from each call, since the communication is direct between users, without the manufacturer's mediation.

Another example is the use of a software for premium services relating to E-mail. It may be advantageous both to manufacturer and user to charge per use, not a global fee for the software. But how to account for use of the software? The manufacturer may even not be aware of the existence of the user, who may have obtained the software from a third party.

Still another problem with prior art systems is the use of "digital cash". Prior art systems involve the issuance of "digital cash" which include a credit for a fixed amount of money, signed by the "cash" issuer.

A possible problem is that these documents can be copied, so each can be used in multiple transactions. To prevent that, the issuer maintains a center which approves in real time each "cash" to be used. This is an immense task, to participate in every business transaction worldwide, more so when one considers the small amounts involved.

At present, there apparently are no methods which may enable a third party to collect a fee from transactions between two parties over a distributed network, where the third party takes no part in the actual transactions between the two parties.

U.S. Pat. No. 122,263 has been filed in Israel on this invention by the present inventor. Application PCT/IL98/00563 has been subsequently filed with PCT.

It is an objective of the present invention to provide for a system and method of payment using tokens, with means for overcoming the abovedetailed deficiencies.

SUMMARY OF THE INVENTION

It is an object of the present invention to provide a system and method for collecting payments or paying for a service or product in a distributed digital communications environment, especially suitable for large networks and the Internet.

In accordance with the invention, the object is basically accomplished using a method of payment including the steps of (a) A transaction management unit receives from a user there a request to perform a service for which payment with tokens is required; (b) The management unit checks whether there are yet unused tokens available in the system. If an unused token was found, go to step (c); If there are no available tokens, then the service cannot be performed, END; (c) The management unit requests information on an available token and changes its status to "canceled"; (d) During the subsequent transaction with the second party, the management unit sends information relating to the token now used and canceled to the second party.

The invention allows a third party to collect a fee from a transaction between two parties, even though the third party does not participate in transactions between the two parties.

According to one aspect of the present invention, a user is provided with electronic tokens or stamps, against a payment. The user, while using the service performed by the service provider, destroys a token or stamp as payment for that service. After several uses of the service, the tokens are all "used" or "destroyed", so the user has to buy new tokens for future use of the service.

Moreover, the method may be used to pay for various available services or products.

According to a second aspect of the present invention, the user is required to make public or present proof that he/she indeed did destroy the tokens as required.

Thus, a party to a transaction and the public in general can monitor the legitimacy of the use of tokens by a specific user. Thus, a large number of possible monitoring persons may verify a large number of the service or software, to ensure there are no illegitimate transactions, or at least that the number of these illegitimate transaction will not grow to large numbers.

According to a third aspect of the present invention, the system and method performs an automatic process of presenting proof of destroying the tokens, and of checking that the other party presented a legitimate proof as well. Thus, during normal transactions between users, users will check each other with respect to the performance of payments as required, without requiring a deliberate effort on the part of the users. Furthermore, the software package will include means for automatically displaying and reporting any detected lack of payment or lack of report of tokens being destroyed as required.

According to still another aspect of the present invention, the system and method include means for diffusing the information on the use of tokens among many users, to allow high visibility of each user's proper conduct.

Another important aspect of the use of tokens is to pay to a second party for a service or product. Whereas the tokens provider will eventually pay to the second party, there is no need that the tokens provider approve in real time each and every transaction.

Payments with electronic/digital tokens are known in prior art. The present invention comprises improvements in such payment means. The present disclosure does not delve into the details of hardware and software implementation of prior art means, for the sake of clarity.

Further details of prior art payment systems and methods using electronic tokens can be found, for example, in the following patents, which are hereby included by way of reference:

Krsul et al., U.S. Pat. No. 5,839,119—Method of electronic payments that prevents double spending Stefic et al., U.S. Pat. No. 6,236,971—System for controlling the distribution and use of digital works using digital tickets Rosen, U.S. Pat. No. 6,205,436—Trusted agents for open electronic commerce where the transfer of electronic merchandise or electronic money is provisional until the transaction is finalized Christiano, U.S. Pat. No. 5,386,369—License metering system for software applications Moreover, the invention discloses an effective method for dissemination of tokens to users. The special structure and operation of a large-scale, distributed payment system impose special requirements, including inter alia the need to effectively distribute tokens to a huge number of users of these tokens, and to keep track of them all.

Further objects, advantages and other features of the present invention will become obvious to those skilled in the art upon reading the disclosure set forth hereinafter.

BRIEF DESCRIPTION OF DRAWINGS

FIG. 5 illustrates another embodiment of the structure of a report detailing the use of tokens.

FIG. 6 illustrates a structure of a tokens use report, with means for token use diffusion among users.

DESCRIPTION OF THE PREFERRED EMBODIMENTS

A preferred embodiment of the present invention will now be described by way of example and with reference to the accompanying drawings.

Figure 1:
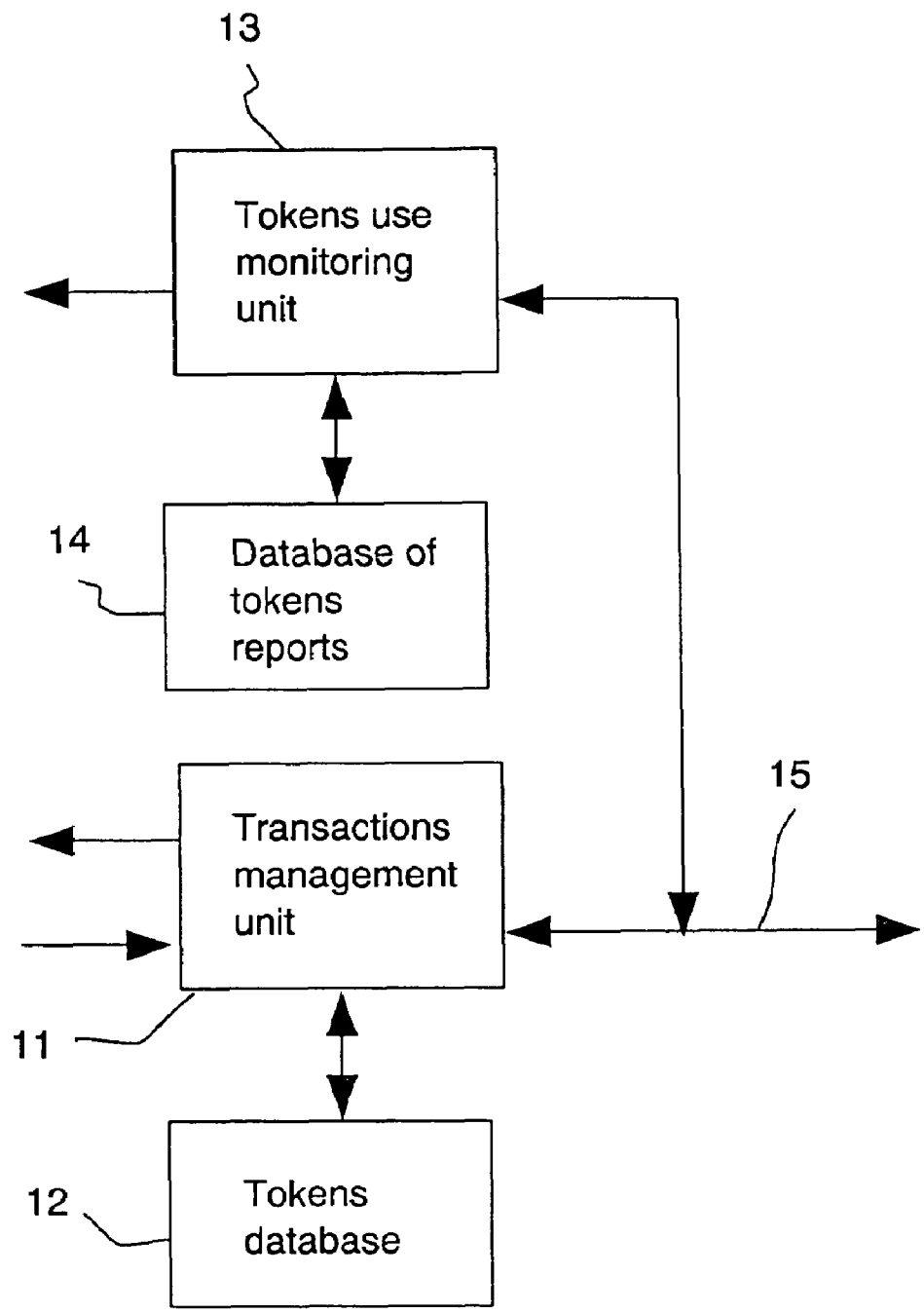
FIG. 1 illustrates the structure of a system for presenting reports on tokens to other users, and for monitoring other's reports.

Referring to FIG. 1, a system for presenting reports on tokens to other users and for monitoring other's reports may include the following parts:

1. a transactions management unit 11, using tokens. The unit 11 is activated when the user requires to perform a service for which payment using tokens is required. For example, such a service may include a special type of E-mail or an encryption procedure or other service provided, on the Internet or elsewhere.

2. a tokens database 12, which includes information on tokens acquired from the service provider, which is usually also the tokens issuer. Unit 11 reads tokens from the database 12 each time there is a requirement to use the service and pay with tokens. Only if there are tokens available, will the service be performed. If the service is performed, then the database 12 is instructed to "cancel" the token, that is to indicate that the token was used.

Thus, database 12 serves as a storage for tokens, keeping both used and available tokens and additional information related to these tokens.

3. tokens use monitoring unit 13, to verify the correct use of tokens by other parties who connect to the system as shown.

4. a database of tokens reports 14, including information on acquired tokens available for performing the service for fee. Each token also includes status indicating means, which change from "ready" to "used" or "canceled" after a token is used.

5. a communication channel to other users 15. Channel 15 may include a telephone line and/or a wireless link or a connection to Internet or other means for performing a digital communication session with other users.

Tokens may be used as payment means for a wide variety of services, for example including but not limited to registered E-mail, legal E-mail, permits generation and management, certificates generation and management.

Tokens may also be used to pay for products in commercial transactions over the Internet.

To achieve these goals, the system detailed in FIG. 1 may be used, together with methods to be detailed below.

Method 1 for Providing Paid Services

A method for providing service with tokens used as payment means may include the following steps:

a. Transaction management unit 11 receives from the local user a request to perform a service for which payment with tokens is required.

b. Unit 11 checks whether there are yet unused tokens available in the system, that is in tokens database 12, that is tokens whose status is "ready" as opposed to "used" or "canceled".

If an unused token was found, go to step (c);

If there are no available tokens, then indicate to the user that the service cannot be performed because of lack of tokens, then END.

If there are no available tokens, then indicate to the user that the service cannot be performed because of lack of tokens, then END.

c. Unit 11 requests and/or retrieves information on an available (unused as yet) token from the database or storage unit 12. The status of the token which was retrieved will be automatically changed in the database 12, and will thereafter be designated as "used" or "canceled".

d. During the subsequent transaction with another party, unit 11 sends information relating to the used token to that other party, through channel 15.

Method 2 for Monitoring Proper Use of Tokens

A method for monitoring proper use of tokens by other users may include the following steps:

a. Tokens use monitoring unit 13 receives reports from other users, indicating their use of tokens and cancellation of tokens in each transaction.

b. Unit 13 transfers the received reports to a database of tokens reports 14, which including information on use of tokens by other users. Preferably, latest information on tokens is store, and oldest information is discarded.

c. Unit 13 requests and/or retrieves information on previous reports from the same user from database 14.

d. Unit 13 processes reports on the use of tokens by the other user, comparing according to predefined criteria.

e. If a criterion was violated, that is the reports indicate a fraud or inappropriate use of tokens, then unit 13 stores that information in database 14 and/or displays a violation report and/or reports that to the tokens issuer, and/or sends a note to the user of such token.

Thus, the structure and operation of the system detailed above allows for secure payment over a distributed network. There is no need that the tokens provider take part in each and every transaction, since two parties can do business and report use of tokens directly. Thus there is no requirement that a huge center be organized, to approve each transaction.

Moreover, the abovedetailed system and method allow a third party (the tokens issuer) to collect a fee from a transaction between two parties, even though that third party does not participate in transactions between the two parties.

For example, with a walkie-talkie/wireless sets provider, the provider can now collect a fee per call, using tokens. Tokens may be loaded into the wireless set and their use accounted for as detailed above, including a report to the other party for verification purposes.

Using this invention, wireless sets like citizen band systems can now be sold at a discount or even distributed for free, like cellular sets.

Until now, that was not possible since, whereas cellular sets connect through a center and bring a fee to the manufacturer each time the set is used, wireless sets are used directly between users and a fee policy could not be enforced.

Another example—now a software package for premium services relating to E-mail may be freely distributed, and the provider may get paid as the package is used.

Although the package is used directly between users, without the intervention of the software provider, the use of tokens as per the present invention ensures that the software provider will be paid for the service.

The invention may be advantageously used to pay for services on a network, especially for services required irregularly, where the user desires to pay per use.

For example, a user may desire to connect to a database. The prevalent method of payment now in use is a subscription for a fixed period, so that during that period the user is permitted unlimited access to the database, or a given amount of time. This may not be a satisfactory solution, since there are so many databases and other services now available, that a user may desire to use just a short time in each of them. But it may not be economical to subscribe to all of them, and to pay for a long time in each, where the user expects not to fully utilize all that time.

The use of tokens according to the present invention solves the problem, since now the user is free to select each of the services which accept these tokens, and pay only as per actual use.

Other examples of resources in a net may be hardcopy printers belonging to a third party. A user may use the printer and pay with tokens, according to the volume of use, or the number of pages printed.

Another example would be for network computers. A new concept in computers relates to a system where each user will have just a simple, low cost computer, and will use software resources available in the net. For a commercially viable system, there should be a payment for the use of these resources.

Resources may include advanced word processors, database systems, super fast signal processors and much more. There are so many resources available, and so many users. There is the difficult problem of paying for the use of these resources, and for accounting for actual use of each resource by each user.

All these problems are solved with the tokens according to the present invention, as detailed above. The provider of the services may offer the services through many outlets. Separately, the provider sells tokens for the use of these resources. Then the provider does not have to take part in every transaction, but the tokens will be used and new tokens will have to be bought by users, as detailed above.

The abovedetailed applications refer to payments to a third party for services rendered.

Another important application of tokens is to actually pay to a second party for a service or product. According to implementation, tokens may each represent a fixed amount of money or time of use of resource, or a specific number of calls using a resource.

A token may represent a prepaid amount of money, or a credit to that specific amount.

An example involves not the Internet, but a local net, like a net in a business center. Many firms may have offices in the center, and they all may occasionally use services provided by other firms there, like printing or copying or data archiving or CD-ROM programming or ordering products like office supplies.

All the firms, customers and service providers, are connected through the local communication net. Services are ordered through the net, and payment is made with tokens according to the present invention.

Another example is in motels where a counter is activated for the use of electricity or gas. The counter is coin operated, and the guest pays in advance for a specific amount of the service to be used.

Here, tokens are used to actually pay to a second party for a service or product. Unlike prior systems, here there is no need that the tokens provider approve in real time each and every transaction. Thus, no huge centers are required to support all the transactions in the world.

Some amount of fraud is expected, but fraud has a good chance of being detected and may possibly be traceable to source. This is achieved with a relatively low cost center, that is a center which does not take part in every transaction and does not have to respond in real time.

No system is completely secure, as intruders may interfere with the authorization process itself, may break the encryption codes or may devise other methods. In a commercial enterprise, what matters is the level of security versus the cost to achieve it.

If a statistically reasonable security is achieved at reasonable cost, that may be satisfactory; losses may be further reduced with insurance. This is a practical solution to security over the net.

Thus, an acceptable business solution can be achieved.

Figure 2:
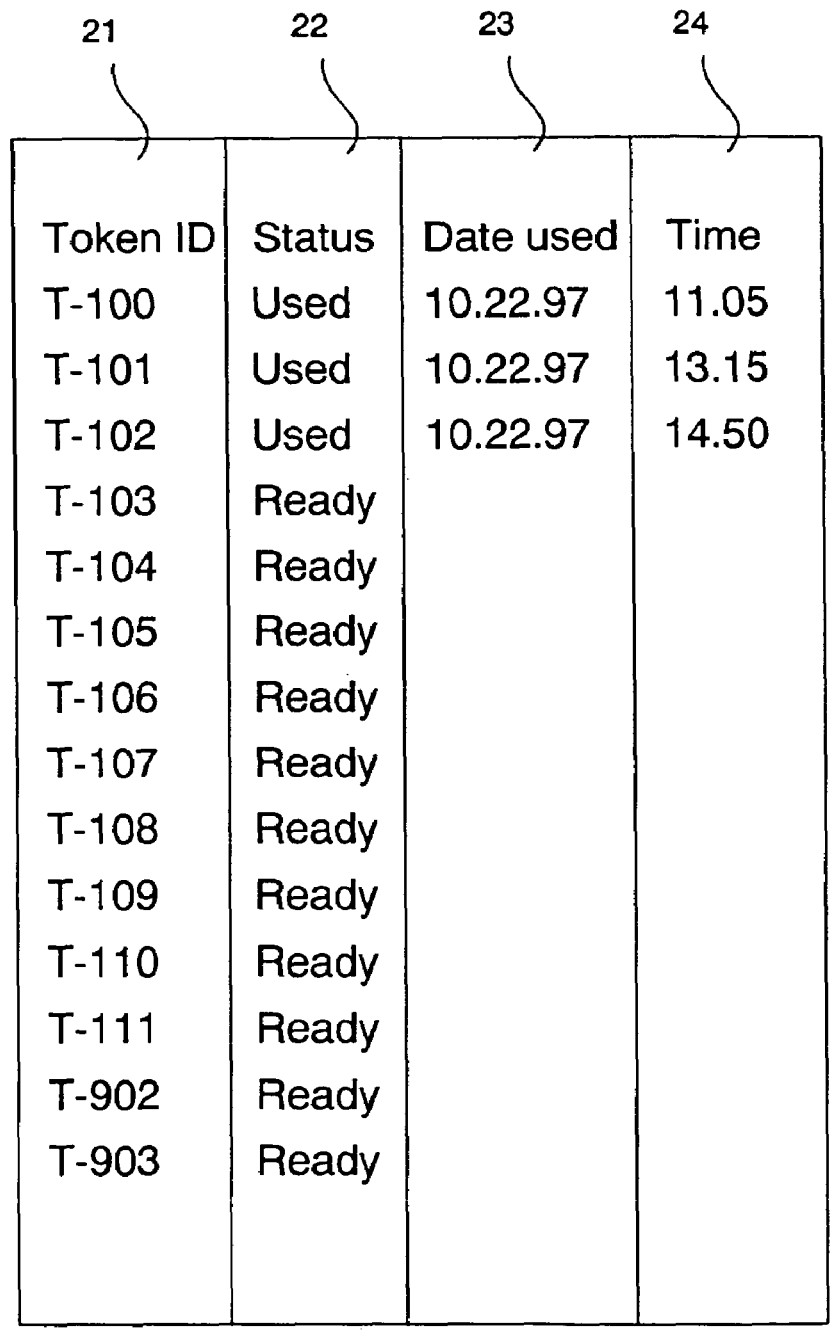
FIG. 2 details the structure of a token information management and storage database.

FIG. 2 details the structure of a token information management and storage database.

This is one embodiment of information stored in the tokens database 12 (see FIG. 1).

Database 12 may include token identification part 21, which includes (not shown) token unique serial number and optional additional information, all signed or encrypted with the private key of the service provider and/or the tokens issuer.

The optional information may include the value of a token, if several products/services are available. Thus, the present invention is not limited to use/payment with one service provider. Tokens may be presented to various providers of services or products.

If token is presented to a third party, that party may require payment from the tokens issuer, so in effect the issuer performs the actual payment between users.

A token status part 22, indicates whether the token was already used or not. If not—it is ready and available for the next use.

A date of use 23, available only for used tokens. Allows subsequent monitoring of transactions and adequate use of tokens.

A time of use 24, only used for used tokens. Allows more precise monitoring of the use of tokens, since many tokens may be used daily and a finer time resolution may be required. In the example, time is given in hours.minutes. A more precise indication may be used, for example down to seconds and even parts of a second. The exact time is less important, than the relative timing of consecutive reports from any specific user.

Tokens are preferably arranged in chronological order of use, with last used token placed first in the list, as shown. Unused tokens are preferably arranged in chronological order with earliest token first. This structure allows for more efficient, faster processing by recipient.

In the example shown, the tokens T-100, T-101 and T-102 were already used, as indicated in the status part 22 and the date of use 23 and time 24.

Tokens T-103 to T-111, T-903 and T-903 are ready to use.

Tokens T-100 to T-111 may have been issued at a specific date, with tokens T-903 and T-903 issued at a later date. Hence the different serial number and the relative location in the table.

Figure 3:
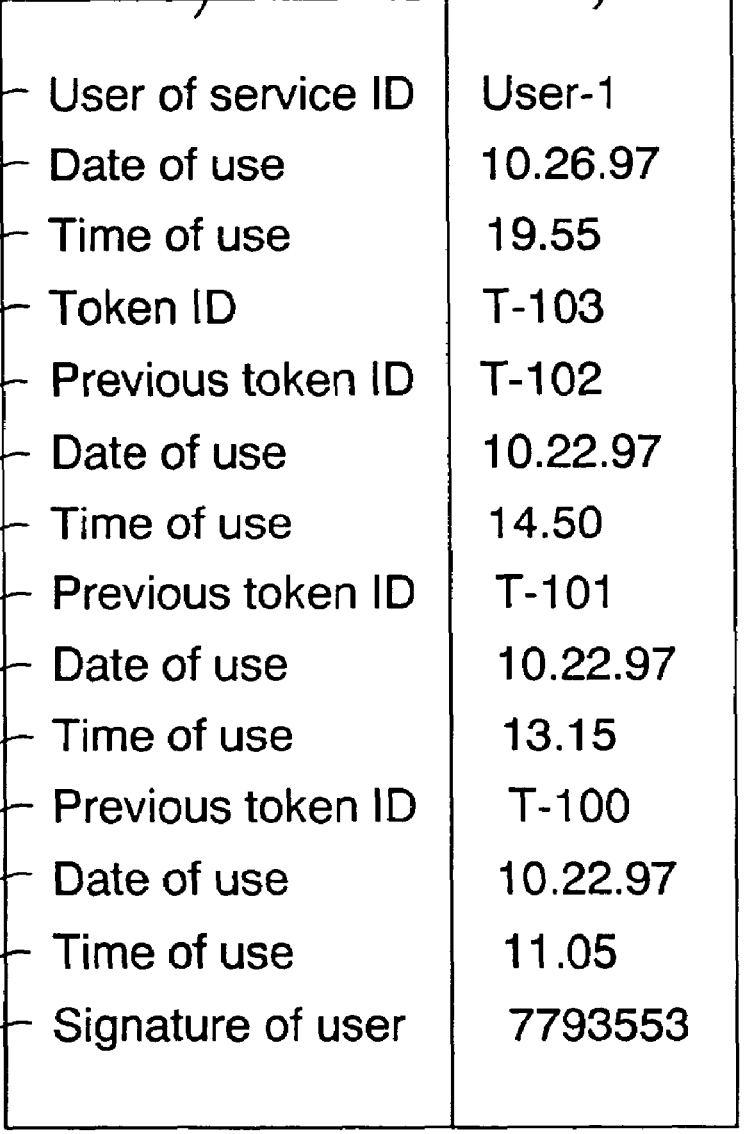
FIG. 3 illustrates the structure of a report detailing the use of tokens.

FIG. 3 illustrates the structure of a report detailing the use of tokens. This is sent to another user during a transaction therebetween which requires that User-1 will "spend" or "use" or "lose" a token.

The report is sent so as to show the other party that indeed payment was performed for the transaction.

This report enables the second party to verify that indeed User-1 had a token available prior to the transaction, and did destroy that token during the transaction, as required.

As detailed there, the logical parts of the report in column 31, with an example of possible specific values assigned to these parts in column 32.

User of service ID 331 contains the name or nickname or other information to identify the user who pays with tokens. The name should be understood or traceable by the service provider and/or tokens issuer, since they are the ultimate party who monitors the use of their tokens. In this example, a nickname "User-1" is reported.

Tokens are preferably arranged in chronological order of use, with the last used token (the token used in the present transaction) being placed first in the list, as shown.

The report may otherwise indicate which token was used last, and the order of use of previous tokens. This information is helpful to allow monitoring for correct use of tokens, as detailed below.

There may be a limit on the number of used tokens reported, to keep the communications effective. Then—only the last token(s) may be transmitted to other users, for example one or five or ten or 100 for example. Here, only three previous tokens are shown, however the actual number of tokens may be much larger.

The date of use 332 indicates the date of use of the service, that is the day when a specific token (to be detailed as well) was destroyed or canceled. In the example, the date is Oct. 26, 1997.

The time of use 333 is the time when the token was canceled, here 19.55. In one embodiment of the invention, a common time may be used by all the users in the system, for example Greenwich time.

In another embodiment, each user presents his/her local time. Since time of various reports is compared separately for each user, there is no need to compare time reports among different users, so there is no need for a uniform time base.

In other words, consecutive reports from any user may be checked to ensure that the time and date reported therein are in chronological order. It is not allowed to prevent a report, and to send it at a later date—this may be indicative of fraudulent activity. The time relationship among reports from different users, however, may not include significant information indicative of possible fraud, and in any case are much more difficult to verify.

The token ID 334 indicates the specific token which was used in the present transaction, in this example the value was T-103. Token ID 334 may include (not shown) an unique serial number, together with the signature of the tokens issuer. The signature may use the private key of the issuer. Alternatively, an unique combination of serial code and date may be used. In still another embodiment, a digital code indicative of time of issue may be used.

Additional optional information may include the details of the buyer of that token (to whom it was sold), an expiry date and/or other information. All the information may be signed by the tokens provider. Previous token ID 335 indicates the token which was used in a previous transaction by User-1, that is the last token used before token T-103. In the example, this was token T-102.

A report including this information allows the other party to the transaction to verify that the tokens reported to be used are changing with time, that is that User-1 updates his/her tokens database and presents each time a different token, thus User-1 pays for the transaction with tokens, as required.

The date of use 336 may be useful for monitoring the use of tokens, here its value is Oct. 22, 1997.

The time of use 337 allows a more precise comparison and evaluation of reports, here it was 14.50.

A plurality of previously used tokens is preferable since it increases the chance that the other party has in their database a related report, and can detect discrepancies if the use of tokens was not proper.

In the example illustrated, previous token ID 338 is T-101, and its date of use 339 is Oct. 22, 19997. Time of use 340 is 13.15.

Still a previous token used ID 341 was, in this example, T-100. The date of use 342 was Oct. 22, 1997, and the time of use 343 was 11.05.

The signature of user 344 is proof that User-1 sent that report. It may include a hash or CRC of the abovementioned information, encrypted with the private key of User-1.

Using the information in the report as detailed in FIG. 3, a tokens use monitoring unit 13 (See FIG. 1) at another user's facility may monitor the transaction for proper use of tokens. The monitoring unit 13 uses information in a database of tokens reports 14 attached thereto.

An implementation of a monitoring routine is illustrated as Method 13 below. The method is automatically performed by computer means (not shown) at another user's facility.

Method 3 for Monitoring Use of Tokens

A second user, upon receiving a tokens use report, can evaluate the report to determine whether improper use of tokens has been made by User-1, by performing the following steps:

a. The token ID, date and time of all tokens reported are compared, to ensure that they are different. That is, there are no two tokens with identical ID, and there are no two tokens which were used at exactly the same date and time.

If two identical tokens or identical time/date was found—then a discrepancy was detected, go to step (z) (store, display and/or report misuse of tokens).

b. The date and time of all tokens reported are compared, to verify whether they are in chronological order, with the last token used located first in the list.

If they are not in order—then a discrepancy was detected, go to step (z) (store, display and/or report misuse of tokens).

c. Each token in the report is compared with tokens stored in the database of tokens reports 14 (see FIG. 1), for User-1.

If a token with the same ID was detected, but with a different time/date, or a token with an identical time/date but with a different token ID was found in the database, then a discrepancy was detected, go to step (z).

d. The time span of the tokens in the report is evaluated, that is the time between the first used token and the last used token.

If a token report was found in the database, whose time is within the above time span but for which there is no corresponding token report in the report, then a token report is missing, thus a discrepancy was detected, go to step (z).

e. Conclusion: no discrepancy was found. END.

z. Conclusion: a discrepancy was detected. Store details of present transaction, display to user and/or report misuse of tokens. END.

The above method is efficient in a statistical sense. It cannot guarantee that absolutely no one will misuse the system, however misuse on a large scale has a good chance of being detected. Thus, it is not necessary that each user store huge databases with reports of past use of tokens. Even with modest databases, a user who frequently misuses the system has a good chance of being detected doing so.

The method can thus effectively prevent large scale fraud and avoidance of payments due.

FIG. 4 illustrates the use of reports on tokens in transactions between various users.

Figure 4A:
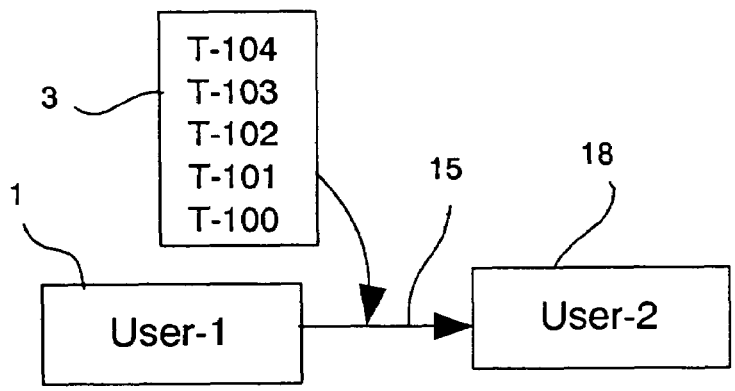
FIG. 4 illustrates the use of reports on tokens in transactions between various users, with FIGS. 4(A), 4(B) and 4(C) illustrating three possible consecutive transactions.

As illustrated in FIG. 4(A), a first user 1 (User-1) may connect to various other users. It is assumed in the example that first user 1 is the party who has to pay with tokens for the transactions as detailed. An identical method is used when user 1 is addressed by another party, and that other party then sends a report instead.

A first user 1 connects through communication channel 15 to a second user 18 (User-2 in the example).

A tokens use report 3 is sent from first user 1 to the second user 18. Report 3 includes details on token T-104 (the presently used token) as well as previously used tokens T-103, T-102, T-101 and T-100. Actually a report 3 may be more detailed, to include for example information as detailed in FIG. 3 above.

This is apparently a legitimate transaction with legitimate past transactions, since all the tokens are different and in consecutive order.

Figure 4B:
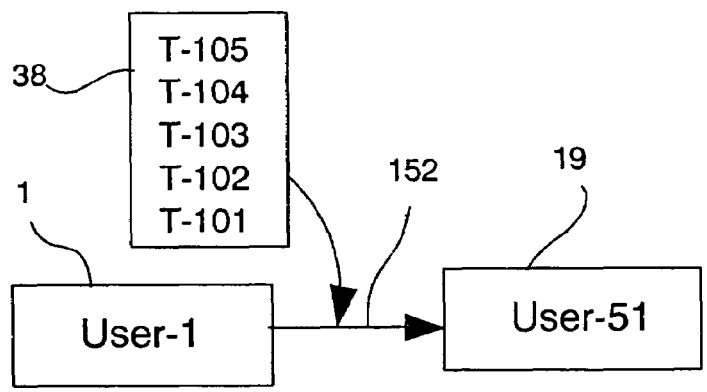

A subsequent transaction is illustrated in FIG. 4(B). Here, the first user 1 (User-1) connects to a third user 19 (User-51), through communication channel 152. The communication channels may be different, or the same channel may be used.

A tokens use report 38 is sent from first user 1 to third user 19. Report 38 is an updated version of report 3 above, to indicate token T-105 as the presently used token. Token T-104 now belongs to the previously used tokens list, together with T-103, T-102 and T-101. Assuming that the reports are limited to four previous tokens, then token T-100 (the oldest) is now removed from the report. The list may include many more tokens, however it should preferably be limited anyway, to prevent waste of communication time and of storage space. Thus, a limit will be reached eventually, and then the oldest tokens will be removed from subsequently transmitted reports.

Figure 4C:
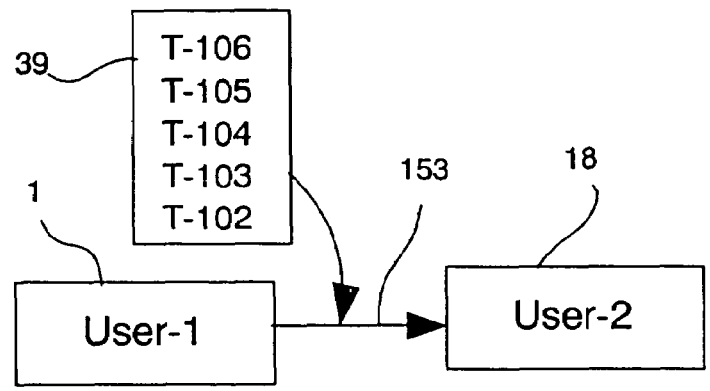

A later transaction is illustrated in FIG. 4(C). Here, for example, the first user 1 (User-1) connects again to the second user 18 (User-2).

A communication channel 152 may be used, maybe a channel different than that used in the previous transaction illustrated in FIG. 4(A).

A tokens use report 39 is sent from first user 1 to second user 18.

Again the report 39 is an updated version of report 38, to indicate token T-106 as the presently used token. Tokens T-105, T-104 now belong to the previously used tokens list, together with T-103 and T-102. Token T-101 (the oldest) is now being removed from the report 39.

The reports 3 and 39 associated with the transactions with second user 18 now allow the second user 18 to compare the reports to verify whether the first user 1 is using tokens properly, as detailed in Method 4 below.

Method 4 for Monitoring the Use of Tokens

A user 18, upon receiving two subsequent token use reports 3, 39 from a first user 1, may evaluate the reports to determine whether improper use of tokens was made, by performing the following steps:

a. The tokens used in the two reports 3, 39 are compared to ensure they are different (that is, the token ID is different).

If the same token is used in different transactions—then a discrepancy was detected, go to step (z) (store, display and/or report misuse of tokens).

In the example as shown, report 3 indicates that token T-104 was used, whereas later report 39 indicates the use of token T-105. Therefore, there appear to be no discrepancy in this respect.

b. The date and time of the tokens used in the two reports are compared, to verify whether they are in chronological order.

If the later report 39 has the same date/time as the earlier report 3, or if the later report 39 has an earlier date/time than the earlier report 3—then a discrepancy was detected, go to step (z) (store, display and/or report misuse of tokens).

In the example as shown, the date and time was not detailed in reports 3, 38 and 39. The method should be applied taking in consideration the presented of such information in one or other form, as illustrated and described with reference to FIG. 3 above.

c. Each token in one report 39 is compared with the tokens stored in the other report 3. If there is an overlap between the tokens, then the tokens should appear in the same order, with none missing, otherwise a discrepancy is declared.

For example, if report 39 details used tokens as T-107, T-106, T-105, T-103 and T-102, whereas report 3 indicated tokens T-104, T-103, T-102, T-101 and T-100, then a discrepancy was found—in the later report 39 the use of token T-104 between T-103 and T-105 is missing.

It was probably erased to allow fraudulent later reuse of that token.

If a discrepancy was detected, then go to step (z).

d. Conclusion: no discrepancy was found. END.

z. Conclusion: a discrepancy was detected. Store details of present transaction, display to user and/or report misuse of tokens. END.

Again, the method is efficient in a statistical sense. However, by comparing two or more reports from the same user, a higher probability of detecting fraud by the first user 1 is achieved.

FIG. 5 illustrates another embodiment of the structure of a report detailing the use of tokens, with means for transferring information on use of tokens between users.

The logical parts of the report in column 31, with an example of possible specific values assigned to these parts in column 32.

The report here differs from that illustrated in FIG. 3 in that now the sender signs each token used, separately. Thus, the report includes User of service ID 331 contains the name or nickname or other information to identify the user who pays with tokens.

Again, tokens are preferably arranged in chronological order of use, with the last used token placed first in the list, as shown.

Date of use 332 indicates the date of use of the service, that is the day when a specific token (to be detailed as well) was destroyed or canceled. In the example, the date is Oct. 26, 1997.

Time of use 333 is the time when the token was canceled, here 19.55.

Token ID 334 indicates the specific token which was used in the present transaction, in this example the value was T-103.

Signature-3 346 is the signature of the sender (User-1) on the last token used, that is T-103 and related information. In the example, its value is 3597711.

This is the difference from the report in FIG. 3—now each token reported is also separately signed by the sending party, that is the user who paid with that token and prepared the report shown.

Similarly, other tokens in the report are each signed with Signature-2 (347), Signature-1 (348) and Signature-O (349) respectively.

This structure allows the recipient to distribute part of the token information to other users, so as to diffuse the information relating to the use of tokens. This allows each user to store information on the use of tokens from various users in their respective database of tokens reports 14, and to subsequently compare the information with other reports from other users or from a user directly reporting to them on the use of tokens.

This is automatically implemented in the tokens use monitoring unit 13, see FIG. 1.

FIG. 6 illustrates a structure of a tokens use report, with means for diffusion of reports about token use among other users.

Again, the logical parts of the report are illustrated in column 31, with an example of possible specific values assigned to these parts included in column 32.

The report includes two parts, a report on own use of tokens 41 and a report on other's use of tokens 42

The report 41 includes information on last tokens used by the present sender, as detailed in FIG. 5 above and the related description. It includes an indication of the user of service ID 331, with the name or nickname or other information to identify the sender.

Date of use 332 indicates the date of use of the service, that is when the token 334 was canceled.

Time of use 333 is the time when the token 334 was canceled.

Token ID 334 indicates the specific token which was used in the present transaction.

Signature-3 346 is the signature of the sender (User-1) on the last token used. Similarly, report 41 further includes information on previously used tokens as illustrated in FIGS. 6 and 5.

A report on others' use of tokens 42 is a collection of token reports from various user, as sent by other users when they connected to the present sender and reported their use of tokens.

Thus, in the present example, user of service ID 421 refers to an user designated as User-5, who had previously reported the use of a token on the Date of use 422, that is the date when the token 424 was canceled in the User-5 tokens database.

Time of use 423 is the time when the token 424 was canceled.

Token ID 424 indicates the specific token which was then used.

Signature-37 425 is the signature of the sender (User-5) on the report relating to the use of that token, T-788 used.

Similarly, report 42 further includes information on other users' use of tokens, like User-19 illustrated there.

Each such token report is extracted from a report from another user, in the form as illustrated in FIG. 5. Thus, if the sender signs for each token reported, then each token can be included by recipient in his/her reports to other users.

Thus, a report regarding the use of a token becomes highly visible, since it may be communicated to many other users.

The advantage of the method is that the public becomes the watchdog over the proper use of the tokens.

The process is automatic, thus fast and effective, and does not require an effort on the part of the user.

Since the reports on the use of tokens may be further transferred to other users, there is no indication of the parties to a specific transaction, at a given time. Thus, the privacy of the transactions is preserved, while allowing the monitoring of the use of tokens by many users.

When a user communicates with the token issuer entity, they can transfer the various reports stored in that user's storage. The tokens issuer can then perform further tests and comparisons based on that information and additional information from other users, to detect illegitimate use of tokens.

Method 5 for Dissemination of Information Relating to Use of Tokens a. unit 11 requests and/or retrieves information on an available (unused as yet) token from the database or storage unit 12, as well as information on previously used tokens;

b. unit 11 prepares a first part of a token use report, including information on the last token used as well as previous tokens used by the present user;

c. tokens use monitoring unit 13 request and/or retrieves from unit 14 reports on the use of tokens by other users, and transfers these reports to unit 11;

d. unit 11 prepares a second part of a token use report, including information on the use of tokens by other users;

e. a report including the first part prepared in step (b) and a second part prepared in step (d) is sent to another user during a paid transaction.

In another embodiment of the invention, the second part of the report in step (d) may be performed by unit 13, then sent to unit 11 or directly to the other user.

In still another embodiment, information relating to violation of token use rules by others is always included in the token use report. Thus the information on violations or fraud is diffused throughout the system, until it reaches the tokens issuer or other party with enforcing capabilities.

Method 6 for Verification of the Use of Tokens a. Tokens use monitoring unit 13 receives reports from other users, indicating their use of tokens, as well as information on the use of tokens by others;

b. Unit 13 transfers the received reports to a database of tokens reports 14;

c. Unit 13 organizes the information in database 14 according to chronological order and separately for each user;

d. For each user, the reports on the use of tokens are processed as detailed in the following steps, to detect conflicts or inconsistencies;

e. The token ID, date and time of all tokens reported are compared, to ensure that they are different. That is, there are no two tokens with identical ID, and there are no two tokens which were used at exactly the same date and time.

If two identical tokens or identical time/date was found—then a discrepancy was detected, go to step (z) (store, display and/or report misuse of tokens).

f. The date and time of all tokens reported are compared, to verify whether they are in chronological order, with the last token used located first in the list.

If they are not in order—then a discrepancy was detected, go to step (z) (store, display and/or report misuse of tokens).

g. Each token in the report is compared with tokens stored in the database of tokens reports 14 (see FIG. 1), for User-1.

If a token with the same ID was detected, but with a different time/date, or a token with an identical time/date but with a different token ID was found in the database, then a discrepancy was detected, go to step (z).

h. The time span of the tokens in the report is evaluated, that is the time between the first used token and the last used token.

If a token report was found in the database, whose time is within the above time span but for which there is no corresponding token report in the report, then a token report is missing, thus a discrepancy was detected, go to step (z).

i. Conclusion: no discrepancy was found. END.

z. Conclusion: a discrepancy was detected. Store details of present transaction, display to user and/or report misuse of tokens. END.

Moreover, the present invention discloses an effective method for dissemination of tokens to users. One possible method is to create a file "token", to include an indication of the value of the token, signed or encrypted with the private key of the tokens provider. Each token may represent a fixed amount of money or time of use of resource, or a specific number of calls using a resource, as the need be.

A disadvantage of the above method is that, for huge amounts of tokens distributed to many users, it may be difficult for the tokens issuer to keep track of them all, to prevent duplicates and to detect fraud.

Thus the tokens issuer may become a bottleneck in the digital commerce. The above special requirements stem from the structure and operation of a large-scale, distributed payment system.

A possible method to effectively distribute tokens to a huge number of users and to keep track of them all is not to actually create and distribute the tokens, but for the tokens issuer to give permits to each user, to generate the tokens themselves, as detailed in Method 7.

Method 7 for Tokens Creation by Users a. User calls tokens issuer, and asks for a specific number (K) of tokens. User pays for the tokens or uses credit, as per the business arrangement between user and tokens issuer;

b. Token issuer prepares a digital document, allowing the user to generate K tokens, with specific parameters. These may include the value of each token, and the serial number of the first and last token.

For example, the digital information in the document may effectively say:

"User-73 is hereby allowed to issue 100 tokens at value $10 each, with serial numbers 240 to 339. Date issued: Oct. 15, 1997. Valid for 6 months."

The above digital document is signed or encrypted with the private key of the tokens issuer, and delivered to the user. Actually, the document is delivered to a software package at the user's facility, a software which is responsible for tokens issuing and accounting for, that is unit 11, see FIG. 1;

c. To perform a paid transaction, the user software (unit 11) checks whether a token can be issued, according to the permit/digital document. If positive, a counter of used tokens is incremented, and a token prepared with a serial number which is the successor of the last token generated, all within the serial numbers according to the digital document.

For example, a token may effectively include the following:

"Token No. 256, value $10, generated by User-73, according to permit from Issuer-9". The token is signed or encrypted with the private key of User-73.

If encrypted, then an indication to identify User-73 should be left en clair, to allow decryption of the message. Go to step (d).

If all the tokens were already generated according to the digital document issued in step (a), then no token is generated, and the user is informed accordingly "no more tokens available". END.

d. Send the token prepared in step (c) together with the digital document prepared in (a) to the other party, as proof of payment for the present transaction. END.

A measure of safety is achieved in the above method, since the user issuing these tokens may have to sign with his/her private key, so that each token is traceable to source, and if there is suspicion of fraudulent use, then a user may be held accountable.

On the other hand, this very possibility may prevent users from misusing the tokens in the first place, thus achieving the desired safety.

Thus, the safety in this method is achieved not in a centralized system with the center having "dictatorial" powers and intervening in each transaction, but a distributed system "democratic", where users participate in enforcing the tokens and payment policy, and in checking that other users do the same.

In another embodiment of invention illustrated in Method 7, a user will not report to others about the use of tokens, however the system assigns to each token a serial number, with number in ascending order.

A recipient of a token may compare the serial number of the presently received token with the serial number of a previous token or previous tokens. If the serial numbers are not all different from each other and in ascending order, this is an indication of tokens misuse. A tokens misuse is thus displayed for others to see. The method is detailed below as Method 8.

Method 8 for Tokens Creation by Users a. User calls tokens issuer, and asks for a specific number (K) of tokens. User pays for the tokens or uses credit, as per the business arrangement between user and tokens issuer;

b. Token issuer prepares a digital document, allowing the user to generate K tokens, with specific parameters. These may include the value of each token, and the serial number of the first and last token. For example, the digital information in the document may effectively say:

"User-73 is hereby allowed to issue 100 tokens at value $10 each, with serial numbers 240 to 339. Date issued: Oct. 15, 1997. Valid for 6 months."

The above digital document is signed or encrypted with the private key of the tokens issuer;

c. To perform a paid transaction, the user software (unit 11) checks whether a token can be issued, according to the permit/digital document. If positive, a counter of used tokens is incremented, and a token is prepared with a serial number which equals the previous serial number plus a fixed increment (for example, the previous number plus 1), where all the serial numbers are within the serial numbers according to the digital document.

For example, a token may effectively include the following:

"Token No. 256, value $10, generated by User-73, according to permit from Issuer-9". The token is signed or encrypted with the private key of User-73. Go to step (d).

If all the tokens were already generated according to the digital document issued in step (a), then no token is generated, and the user is informed accordingly "no more tokens available". END.

d. Send the token prepared in step (c) together with the digital document prepared in (a) to the other party, as proof of payment for the present transaction. END.

In the above method, there is no need to indicate the date and time, since the serial number of tokens may be used to detect misuse of tokens.

Various embodiments of the present invention will become apparent to persons skilled in the art upon reading the present disclosure.

For example, the order of implementation of the steps in the above methods may be interchanged, while still performing the basic function detailed therein.

It is possible to use tokens of various value, where the value of each token is embedded in the token ID as created by the token issuer. This allows the user to pay various amounts for different services or products, as the need be. This is equivalent to the use of different money bills, each having a different value.

In this case, as the tokens are arranged in the order of their issue, the tokens may also be arranged in the order of their value.

Alternately, several separate sections may be used in tokens database 12, each section including only tokens of a specific value.

To pay varying amounts of money, the methods may be updated to permit the use of a plurality of tokens at one time/date. Such an activity will then be considered as valid.

The recipient has the ability to verify that the tokens are valid, by performing a hash or CRC, then decrypting the hash or CRC in the token with the known, public key of the tokens issuer, and comparing results. If the results do not correspond, then the tokens are false.

The recipient also has the ability to verify the signature of the reports sending party, again by verifying the signature of that party as detailed above: perform a hash or CRC, then decrypt the hash or CRC in the report with the known, public key of the other user issuer, and compare results. If the results do not correspond, then the other user is an impostor.

Throughout the present disclosure, signature by a party involves the computation of a hash or CRC of a piece of information, and encryption of the hash or CRC with the private key of the sender.

A token may include additional information, for example a picture and/or graphics and/or an audio message. Thus a digital token may resemble an ordinary coin, by having a value attached thereto as well as additional information.

A token may be used as letterhead or paper for a firm. The firm assigns tokens to employees, who can use these tokens in official letters, for example in E-mail messages. The token becomes the letterhead of the company in this electronic paper application. The company may authorize employees to use a token in each E-mail message sent in the course of their work. Thus, the token is used as digital paper, to "write" messages thereon.

The tokens need not be prepaid by the user. It is possible to include advertising in the token, with the firm benefiting from the advertising paying for the use of tokens. This approach may be better suited for the Internet environment, where services are generally free. Other methods to replace direct payment by the user may be used.

The advertising may be implemented in the additional information in the token, which may include pictures, graphics, audio and/or other information.

It will be recognized that the foregoing is but one example of an apparatus and method within the scope of the present invention and that various modifications will occur to those skilled in the art upon reading the disclosure set forth hereinbefore.

What is claimed is:

1. A method for collecting payments in a distributed digital computerized communication environment for services provided by a third party service provider, comprising the following steps:
   a. using digital tokens issued by a second party digital tokens issuer by computerized means, during a digital communication between a user and the second party, while the third party is not part of the digital communication issuing the digital tokens; and wherein the digital tokens can be generated by the user himself according to a special and secure digital permit from the digital tokens issuer and according to predefined criteria in different predefined values;
   b. Acquiring by a user of digital tokens from the digital tokens issuer and storing the digital tokens in a user's token database;
   c. canceling the used digital tokens from the user's tokens database, that are being used by the user according to computerized predefined criteria between the user and the digital tokens issuer, when the user uses the service provided by the third party such that there is no exchange of digital tokens between the user and the third party, wherein the digital tokens can be generated by the user himself according to a special and secure digital permit from the digital tokens issuer and according to predefined criteria in different predefined values.

2. The method of collecting payments with digital tokens according to claim 1, wherein the digital tokens can be in different predefined values.

3. The method of collecting payments with digital tokens according to claim 1, wherein the digital tokens are cryptography protected from fraud.

4. The method of collecting payments with digital tokens according to claim 1, wherein the service can be the usage of predefined software package that is in the user's possession.

5. The method of collecting payments with digital tokens according to claim 1, wherein the service can be the usage of wireless resources or any other digital communication means to another user, while the collecting payment party is not involved in the communication.

6. A method for monitoring the proper use, in payment for services provided by a third party, of digital tokens issued by a second arty digital tokens issuer by computerized means, comprising the following steps:
   a. engaging a digital communication between a user and second party, where the third party does not take part in the communication and does not participate in any exchange of digital toke with the user; and wherein the digital tokens can be generated by the user himself according to a special and secure digital permit from the digital tokens issuer and according to predefined criteria in different predefined values;
   b. The user sends to the second party a report including information relating to the digital token used and canceled by the user while using the service for which a payment by digital tokens was required;
   c. The second party maintains a database of previous reports relating to digital tokens used in the past, and the report received in step (b) is added to the database;
   d. The second party compares the information received in step (b) with previous reports for the same user;
   e. If the comparison detects a violation of the rules for the use of digital tokens, then the second party performs one or more of: stores that information, displays a violation report, reports that to the digital tokens issuer, sends a note to the user of such digital token,
wherein the digital tokens can be generated by the user himself according to a special and secure digital permit from the digital tokens issuer and according to predefined criteria in different predefined values.

7. The method for monitoring the proper use of digital tokens according to claim 6, wherein in step (c) the second party maintains a database of previous reports relating to digital tokens used in the past by the user.

8. The method for monitoring the proper use of digital tokens according to claim 6, wherein in step (c) the second party maintains a database of previous reports relating to digital tokens used in the past by a plurality of other users.

9. The method for monitoring the proper use of digital tokens according to claim 6, wherein in step (c) the database of previous reports is being updated to include the latest reports, and the oldest reports are deleted there from.

10. The method for monitoring the proper use of digital tokens according to claim 6, wherein in step (e) one of the rules for use of digital tokens is that no digital token is allowed to be used twice.

11. The method for monitoring the proper use of digital tokens according to claim 6, wherein in step (e) one of the rules for use of digital tokens is that the serial number of successive digital tokens should be in ascending order.

12. The method for monitoring the proper use of digital tokens according to claim 6, wherein in step (e) one of the rules for use of digital tokens is that the serial number of issued digital tokens should correspond to a digital document or digital permit issued by the third party.

* * * * *